US012506313B2

(12) United States Patent
Kimura et al.

(10) Patent No.: US 12,506,313 B2
(45) Date of Patent: Dec. 23, 2025

(54) SHEET TYPE CONDUCTIVE MEMBER AND CONNECTOR

(71) Applicant: Japan Aviation Electronics Industry, Limited, Tokyo (JP)

(72) Inventors: Akira Kimura, Tokyo (JP); Seiya Matsuo, Tokyo (JP); Keisuke Nakamura, Tokyo (JP)

(73) Assignee: JAPAN AVIATION ELECTRONICS INDUSTRY, LIMITED, Tokyo (JP)

(*) Notice: Subject to any disclaimer, the term of this patent is extended or adjusted under 35 U.S.C. 154(b) by 326 days.

(21) Appl. No.: 18/323,606

(22) Filed: May 25, 2023

(65) Prior Publication Data

US 2023/0420902 A1 Dec. 28, 2023

(30) Foreign Application Priority Data

Jun. 27, 2022 (JP) ................................ 2022-102407

(51) Int. Cl.

*H01R 12/00* (2006.01)
*H01R 12/59* (2011.01)
*H01R 12/77* (2011.01)
*H01R 43/00* (2006.01)

(52) U.S. Cl.

CPC ......... *H01R 43/007* (2013.01); *H01R 12/592* (2013.01); *H01R 12/777* (2013.01)

(58) Field of Classification Search

CPC ............................ H01R 12/592; H01R 12/727
See application file for complete search history.

(56) References Cited

U.S. PATENT DOCUMENTS

| | | | | |
|---|---|---|---|---|
| 5,003,673 A * | 4/1991 | Nysten | A44B 17/0005 24/681 |
| 8,192,207 B2 * | 6/2012 | Iida | H05K 3/365 439/67 |
| 10,868,380 B1 * | 12/2020 | Komoto | H01R 12/771 |
| 10,886,650 B1 * | 1/2021 | Komoto | H01R 12/592 |
| 11,024,993 B2 * | 6/2021 | Nakamura | H01R 12/616 |
| 2017/0112200 A1 * | 4/2017 | Mason | H01R 13/052 |
| 2017/0279230 A1 * | 9/2017 | Komoto | H01R 13/2442 |
| 2018/0233854 A1 * | 8/2018 | Komoto | H01R 12/69 |
| 2018/0269606 A1 * | 9/2018 | Nakamura | H01R 12/68 |
| 2020/0366011 A1 | 11/2020 | Nakamura | |

FOREIGN PATENT DOCUMENTS

JP 2020187972 A 11/2020

* cited by examiner

*Primary Examiner* — Phuong Chi Thi Nguyen
(74) *Attorney, Agent, or Firm* — MUNCY, GEISSLER, OLDS & LOWE, P.C.

(57) ABSTRACT

A sheet type conductive member includes a tongue portion projecting in a tongue shape in a predetermined plane, a contact arrangement region in which a contact of a connector is arranged being laid out on a front surface of the sheet type conductive member, a first flexible conductor being exposed on the contact arrangement region, a second flexible conductor being exposed on a rear surface of the tongue portion, at least part of the tongue portion being folded back to a front surface side of the sheet type conductive member so that a contact connecting portion composed of part of the first flexible conductor and part of the second flexible conductor is formed in the contact arrangement region.

11 Claims, 12 Drawing Sheets

SHEET TYPE CONDUCTIVE MEMBER AND CONNECTOR

BACKGROUND OF THE INVENTION

The present invention relates to a sheet type conductive member, particularly to a sheet type conductive member having a flexible conductor exposed on each of opposite surfaces thereof.

The present invention also relates to a connector having the sheet type conductive member.

In recent years, attention has been drawn to so-called smart clothes that can obtain user's biological data such as the heart rate and the body temperature only by being worn by the user. Such a smart cloth has an electrode disposed at a measurement site, and when a wearable device serving as a measurement device is electrically connected to the electrode, biological data can be transmitted to the wearable device.

The electrode and the wearable device can be interconnected by, for instance, use of a connector connected to a flexible conductor drawn from the electrode.

As a structure in which a contact of a connector is connected to a flexible conductor, for instance, JP 2020-187972 A discloses a connecting structure shown in FIG. 30. A contact 2 is disposed on a front surface 1A of a flexible substrate 1, and a linking conductive member 3 having been pushed from a rear surface 1B side toward a front surface 1A side of the flexible substrate 1 is inserted into a recessed portion 2A of the contact 2. When the linking conductive member 3 is inserted into the recessed portion 2A of the contact 2, a cut edge 1C of the flexible substrate 1 is caught and sandwiched between an inner surface of the recessed portion 2A of the contact 2 and the linking conductive member 3.

Consequently, the front surface 1A of the flexible substrate 1 comes into contact with the inner surface of the recessed portion 2A of the contact 2, while the rear surface 1B of the flexible substrate 1 comes into contact with the linking conductive member 3. In addition, a contact portion 3A of the linking conductive member 3 contacts the inner surface of the recessed portion 2A at the innermost part of the recessed portion 2A of the contact 2.

Therefore, when a flexible conductor is exposed on the front surface 1A of the flexible substrate 1, the flexible conductor is directly connected to the contact 2; when the flexible conductor is exposed on the rear surface 1B of the flexible substrate 1, the flexible conductor is electrically connected to the contact 2 via the linking conductive member 3. In addition, when flexible conductors are separately exposed on the opposing surfaces, i.e., the front surface 1A and the rear surface 1B of the flexible substrate 1, both the flexible conductors can be connected to a single contact 2.

Thus, the flexible conductor exposed on the front surface 1A of the flexible substrate 1 comes into direct contact with and is electrically connected to the contact 2, but in the case of the flexible conductor exposed on the rear surface 1B of the flexible substrate 1, the flexible conductor is connected to the contact 2 via the linking conductive member 3 disposed between the flexible conductor and the contact 2, so the number of contact points on a conductive path from the flexible conductor exposed on the rear surface 1B of the flexible substrate 1 to the contact 2 increases.

Further, since the dedicated linking conductive member 3 is used, the number of components also increases.

SUMMARY OF THE INVENTION

The present invention has been made to overcome the conventional problem as above and aims at providing a sheet type conductive member that can electrically connect a first flexible conductor and a second flexible conductor respectively disposed on a front surface side and a rear surface side of a sheet body to a single contact without using a dedicated linking conductive member.

The present invention is also aimed at providing a connector having such a sheet type conductive member.

A sheet type conductive member according to the present invention is one that extends along a predetermined plane and is attached to a connector, the sheet type conductive member comprising:

- a sheet body having insulating properties; and
- a first flexible conductor disposed on a front surface side of the sheet body, and a second flexible conductor disposed on a rear surface side of the sheet body,
- wherein the sheet type conductive member includes a tongue portion projecting in a tongue shape in the predetermined plane,
- wherein a contact arrangement region in which a contact of the connector is arranged is laid out on a front surface of the sheet type conductive member,
- wherein the first flexible conductor is exposed on the contact arrangement region,
- wherein the second flexible conductor is exposed on a rear surface of the tongue portion, and
- wherein at least part of the tongue portion is folded back to a front surface side of the sheet type conductive member so that a contact connecting portion composed of part of the first flexible conductor and part of the second flexible conductor is formed in the contact arrangement region.

A connector according to the present invention comprises:

- the above-mentioned sheet type conductive member;
- the contact electrically connected to the contact connecting portion composed of the part of the first flexible conductor and the part of the second flexible conductor in the contact arrangement region of the sheet type conductive member; and
- a housing having insulating properties and configured to retain the sheet type conductive member and the contact,
- wherein the connector is fitted with a counter connector in a fitting direction.

DETAILED DESCRIPTION OF THE INVENTION

Embodiments of the present invention are described below based on the accompanying drawings.

Embodiment 1

Figure 1:
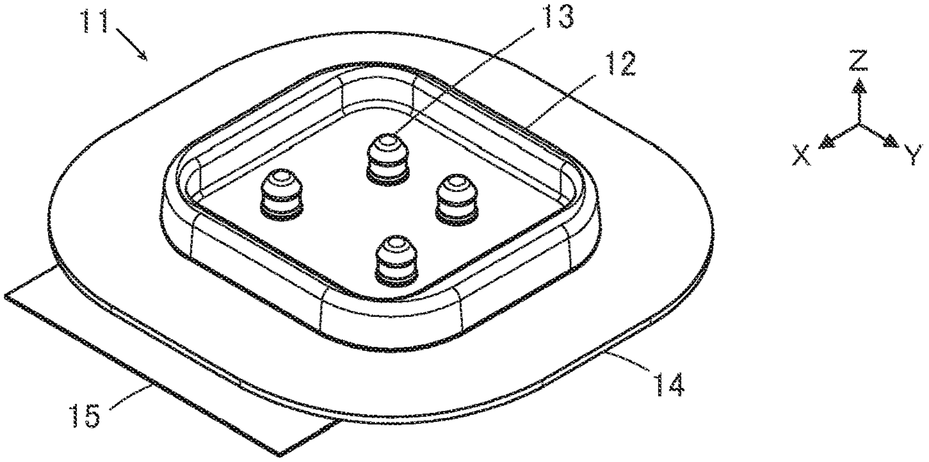
FIG. 1 is a perspective view showing a connector according to Embodiment 1.

FIG. 1 shows a connector 11 according to Embodiment 1. The connector 11 is used as, for example, a garment-side connector for fitting a wearable device, and has a housing 12 made of an insulating material. In the housing 12, four contacts 13 are retained, and a reinforcement sheet 14 and a sheet type conductive member 15 are retained by the housing 12 while being superposed on each other.

The four contacts 13 are disposed to project perpendicularly to the sheet type conductive member 15 in two lines parallel to each other.

For convenience, the reinforcement sheet 14 and the sheet type conductive member 15 are defined as extending along an XY plane, the direction in which the four contacts 13 are aligned is referred to as "Y direction," and the direction in which the four contacts 13 project is referred to as "+Z direction." The Z direction is a fitting direction in which the connector 11 is fitted to a counter connector.

Figure 2:
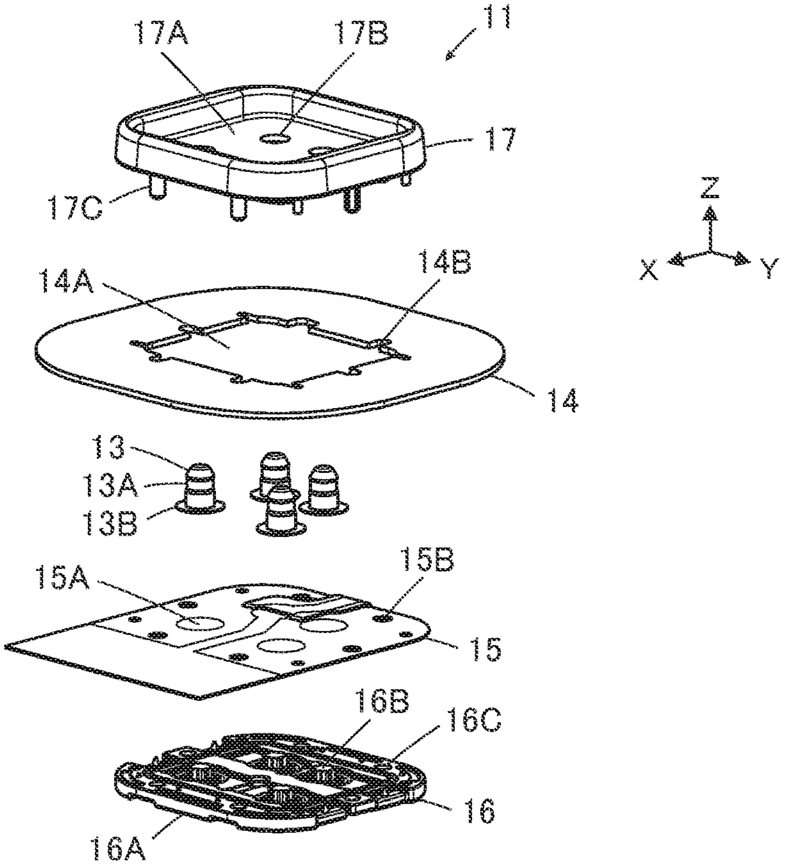
FIG. 2 is an exploded perspective view of the connector according to Embodiment 1.

FIG. 2 is an exploded perspective view of the connector 11. The connector 11 includes a bottom insulator 16 and a top insulator 17, and these bottom and top insulators 16 and 17 constitute the housing 12.

The top insulator 17 includes a recessed portion 17A opening in the +Z direction, and four contact through-holes 17B formed within the recessed portion 17A. The recessed portion 17A constitutes a counter connector accommodating portion in which part of a counter connector (not shown) is to be accommodated, and the four contact through-holes 17B separately correspond to the four contacts 13. In addition, on a surface, facing in the −Z direction, of the top insulator 17, a plurality of bosses 17C are formed to project in the −Z direction.

The reinforcement sheet 14 is provided to reinforce a mounting object such as a garment (not shown) on which the connector 11 is to be mounted, is made of an insulating material, and has an opening portion 14A formed in the center thereof. Further, a plurality of cutouts 14B separately corresponding to the plurality of bosses 17C of the top insulator 17 are formed along the periphery of the opening portion 14A of the reinforcement sheet 14.

The four contacts 13 are plug-type contacts each made of a conductive material such as metal, and are to be connected to corresponding contacts of a counter connector (not shown) when part of the counter connector is accommodated in the recessed portion 17A of the top insulator 17. Each of the contacts 13 has a tubular portion 13A of cylindrical shape extending in the Z direction, and a flange 13B extending from a −Z directional end portion of the tubular portion 13A along an XY plane.

Of the four contacts 13, three contacts 13 are each used as a signal terminal for transmitting an electric signal, and the remaining one contact 13 is connected to a ground potential and used as a shield terminal.

Four contact arrangement regions 15A for separately arranging the four contacts 13 are laid out on a front surface, facing in the +Z direction, of the sheet type conductive member 15, and a plurality of through-holes 15B separately corresponding to the plurality of bosses 17C of the top insulator 17 are formed at the periphery of the sheet type conductive member 15.

The bottom insulator 16 includes a flat plate portion 16A, and on the flat plate portion 16A, four projections 16B are formed to project in the +Z direction. The four projections 16B separately correspond to the four contacts 13. Further, the flat plate portion 16A is provided with a plurality of through-holes 16C separately corresponding to the plurality of bosses 17C of the top insulator 17.

The four contact through-holes 17B of the top insulator 17, the four contacts 13, the four contact arrangement regions 15A of the sheet type conductive member 15, and the four projections 16B of the bottom insulator 16 are arranged so as to align with each other in the Z direction.

Similarly, the bosses 17C of the top insulator 17, the cutouts 14B of the reinforcement sheet 14, the through-holes 15B of the sheet type conductive member 15, and the through-holes 16C of the bottom insulator 16 are arranged so as to align with each other in the Z direction.

The contact through-holes 17B of the top insulator 17 have an inside diameter larger than an outside diameter of the tubular portions 13A of the contacts 13 and smaller than an outside diameter of the flanges 13B to allow smooth insertion of the tubular portions 13A of the contacts 13.

In addition, the cutouts 14B of the reinforcement sheet 14, the through-holes 15B of the sheet type conductive member 15, and the through-holes 16C of the bottom insulator 16 each have a size slightly larger than an outside diameter of the bosses 17C of the top insulator 17.

Figure 3:
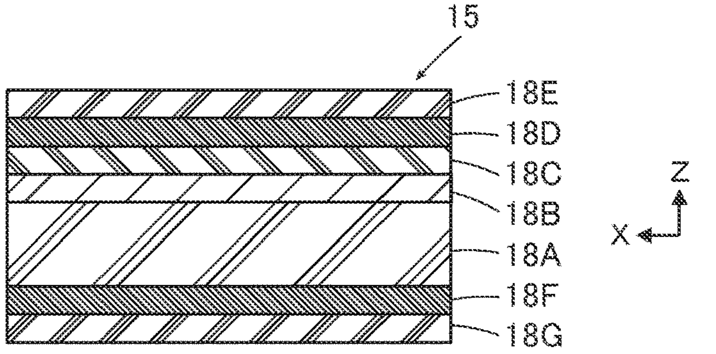
FIG. 3 is a cross-sectional view showing a sheet type conductive member used in the connector of Embodiment 1.

As shown in FIG. 3, the sheet type conductive member 15 includes a sheet body 18A made of an insulating material and has a multilayer structure in which: a signal wiring layer 18B (third flexible conductor) made of a conductive material, an insulating layer 18C, a shield layer 18D (first flexible conductor) made of a conductive material, and an insulating layer 18E are sequentially laminated on a front surface, facing in the +Z direction, of the sheet body 18A; and a shield layer 18F (second flexible conductor) made of a conductive material, and an insulating layer 18G are sequentially laminated on a rear surface, facing in the −Z direction, of the sheet body 18A.

Figure 4:
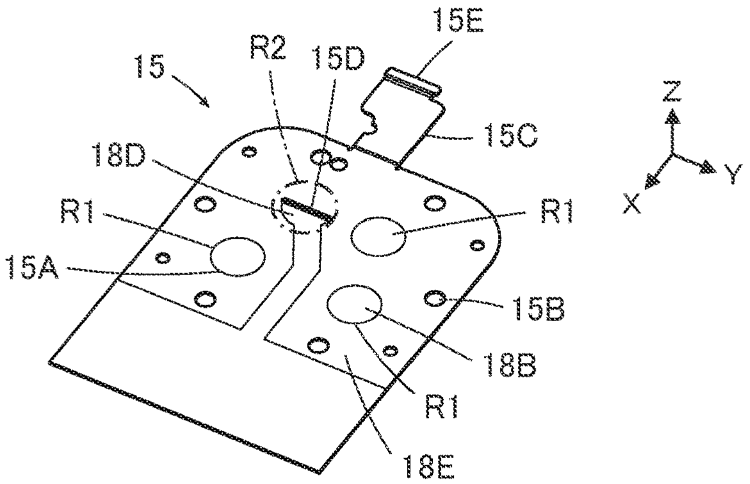
FIG. 4 is a perspective view of the sheet type conductive member used in the connector of Embodiment 1, as viewed from an obliquely upper position.

As shown in FIG. 4, of the four contact arrangement regions 15A laid out on the front surface, facing in the +Z direction, of the sheet type conductive member 15, three contact arrangement regions 15A separately form regions R1 on which the three contacts 13 used as signal terminals are to be arranged, and the remaining one contact arrangement region 15A forms a region R2 on which the contact 13 used as a shield terminal is to be arranged.

In each of the regions R1 on which the three contacts 13 serving as signal terminals are to be arranged, the insulating layer 18E, the shield layer 18D, and the insulating layer 18C are removed so that the signal wiring layer 18B is exposed toward the +Z direction.

On the other hand, in a +X direction-side portion of the region R2 on which the contact 13 serving as a shield terminal is to be arranged, the insulating layer 18E is removed so that the shield layer 18D is exposed toward the +Z direction. In addition, also in a +X direction-side portion of the sheet type conductive member 15, the shield layer 18D is exposed toward the +Z direction, and is integrally connected to the shield layer 18D exposed in the region R2.

The other region on the front surface, facing in the +Z direction, of the sheet type conductive member 15 is covered with the insulating layer 18E.

In addition, on an outside of the contact arrangement region 15A forming the region R2, the sheet type conductive member 15 has a tongue portion 15C projecting in a tongue shape in the −X direction in an XY plane. A front surface, facing in the +Z direction, of the tongue portion 15C is also covered with the insulating layer 18E.

Further, in the region R2, an insertion hole 15D is formed to extend in the Y direction and penetrate from the front surface to a rear surface of the sheet type conductive member 15, and at a −X directional end portion of the tongue portion 15C, an insertion portion 15E is formed to be wider in the Y direction than the insertion hole 15D.

The through-holes 15B of the sheet type conductive member 15 are arranged to surround the four contact arrangement regions 15A.

Figure 5:
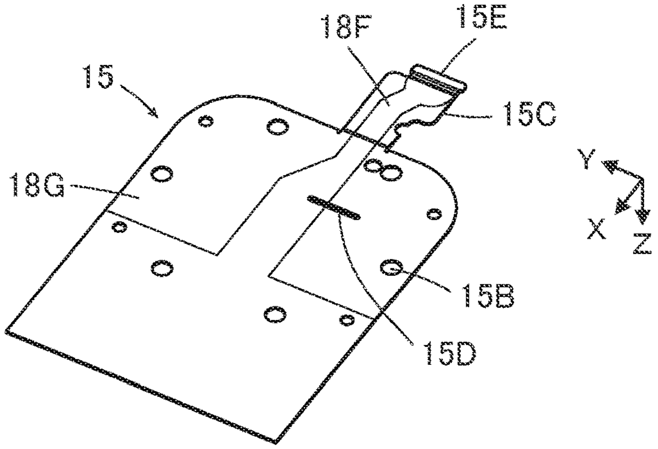
FIG. 5 is a perspective view of the sheet type conductive member used in the connector of Embodiment 1, as viewed from an obliquely lower position.

As shown in FIG. 5, on a rear surface, facing in the −Z direction, of the tongue portion 15C, the insulating layer 18G is removed so that the shield layer 18F is exposed toward the −Z direction. In addition, also in the +X direction-side portion of the sheet type conductive member 15, on the rear surface facing in the −Z direction, the shield layer 18F is exposed toward the −Z direction and integrally connected to the shield layer 18F exposed in the tongue portion 15C.

The other region on the rear surface, facing in the −Z direction, of the sheet type conductive member 15 is covered with the insulating layer 18G.

Figure 6:
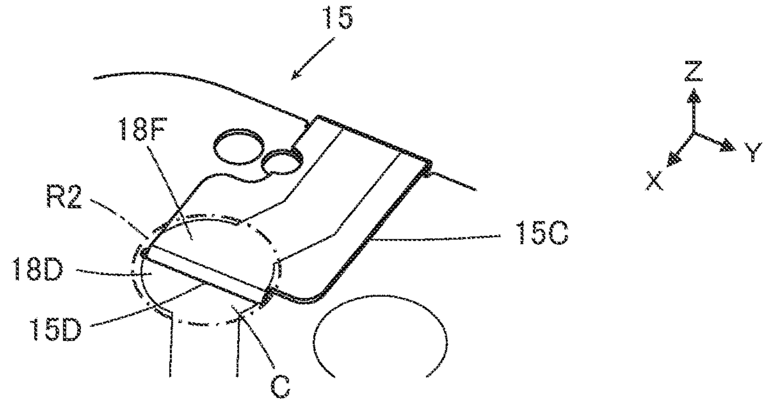
FIG. 6 is an enlarged partial perspective view of the sheet type conductive member in a state where a tongue portion is folded back, as viewed from an obliquely upper position.
Figure 7:
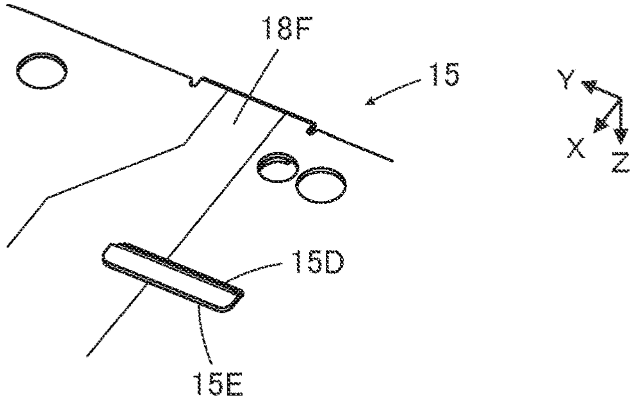
FIG. 7 is an enlarged partial perspective view of the sheet type conductive member in the state where the tongue portion is folded back, as viewed from an obliquely lower position.

Here, when the tongue portion 15C projecting in the −X direction on the outside of the region R2 of the sheet type conductive member 15 is folded back to the front surface side of the sheet type conductive member 15, as shown in FIG. 6, the shield layer 18F exposed on the rear surface of the tongue portion 15C is directed in the +Z direction. In this state, as shown in FIG. 7, the insertion portion 15E formed at the end portion of the tongue portion is inserted into the insertion hole 15D of the sheet type conductive member 15 from the +Z direction side to the −Z direction side.

Since the insertion portion 15E is formed to be wider in the Y direction than the insertion hole 15D, by inserting the insertion portion 15E into the insertion hole as shown in FIG. 6, the tongue portion 15C is retained while being folded back on the front surface side of the sheet type conductive member 15. Consequently, in the region R2 laid out on the front surface of the sheet type conductive member 15, the shield layer 18F exposed on the rear surface of the tongue portion 15C is disposed on the −X direction side of the insertion hole 15D.

That is, the shield layer 18D is exposed on the +X direction-side portion of the region R2, and the shield layer 18F is exposed on a −X direction-side portion of the region R2, so that a contact connecting portion C composed of part of the shield layer 18D and part of the shield layer 18F is formed in the region R2. In the connector 11, the contact connecting portion C is disposed in the region R2 and electrically connected to the contact 13 used as a shield terminal.

Figure 8:
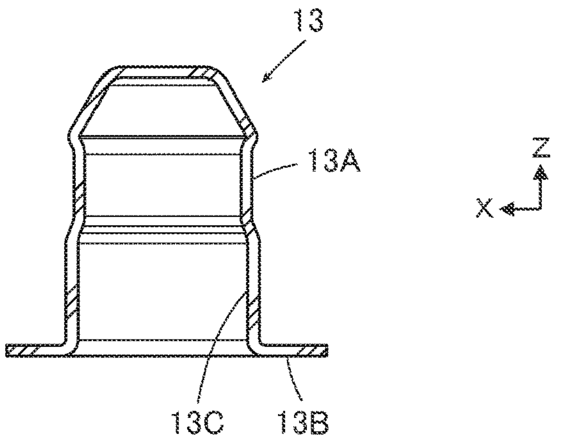
FIG. 8 is a cross-sectional view showing a contact used in the connector of Embodiment 1.

As shown in FIG. 8, the tubular portion 13A of the contact 13 is provided in its interior with a projection accommodating portion 13C of recess shape opening in the −Z direction, and the flange 13B extends along an XY plane from an opening end portion of the projection accommodating portion 13C.

When the connector 11 is assembled, first, the bosses 17C of the top insulator 17 are separately inserted into the cutouts 14B of the reinforcement sheet 14. At this time, the four contact through-holes 17B of the top insulator 17 are situated within the opening portion 14A of the reinforcement sheet 14.

Subsequently, the tubular portion 13A of each of the contacts 13 is inserted from the −Z direction into the corresponding one of the four contact through-holes 17B of the top insulator 17, and the bottom insulator 16 is pressed against the top insulator 17 in the +Z direction with the sheet type conductive member 15 being sandwiched therebetween. At this time, the flange 13B of each of the contacts 13 is situated on the corresponding contact arrangement region 15A of the sheet type conductive member 15, and the corresponding projection 16B of the bottom insulator 16 is inserted into the projection accommodating portion 13C of each of the contacts 13 while pushing the sheet type conductive member 15.

At this time, when the sheet type conductive member 15 is high in stretchability, the projection 16B is inserted into the projection accommodating portion 13C while being wrapped by the sheet type conductive member 15. On the other hand, when the sheet type conductive member 15 is low in stretchability, it is preferable that the sheet type conductive member 15 is cut in advance at a position corresponding to the projection 16B, and the projection 16B is then inserted into the projection accommodating portion 13C.

In addition, by pressing the bottom insulator 16 against the top insulator 17, the plurality of bosses 17C of the top insulator 17 sequentially penetrate the plurality of through-holes 15B of the sheet type conductive member 15 and the plurality of the through-holes 16C of the bottom insulator 16, and the top insulator 17 and the bottom insulator 16 are fixed to each other through heat deformation of a tip of each of the plurality of bosses 17C projecting on the −Z direction side of the bottom insulator 16. Thus, the assembling operation of the connector 11 is completed.

It should be noted that the flange 13B of each of the contacts 13 is sandwiched between the top insulator 17 and the bottom insulator 16 so that the contacts 13 are fixed to the top insulator 17 and the bottom insulator 16.

Figure 9:
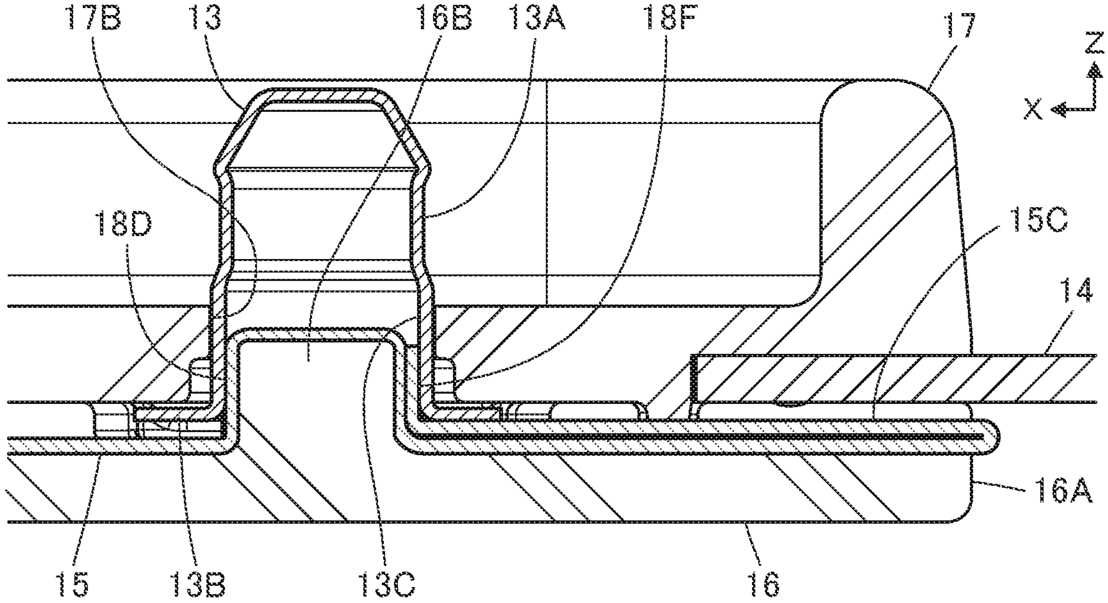
FIG. 9 is an enlarged partial cross-sectional view showing the connector of Embodiment 1.

Here, in the region R2 of the sheet type conductive member 15 in which the contact 13 used as a shield terminal is arranged, as shown in FIG. 6, the shield layer 18D is exposed on the +X direction-side portion of the region R2, and the shield layer 18F is exposed on the −X direction-side portion of the region R2. Therefore, when the projection 16B of the bottom insulator 16 is inserted into the projection accommodating portion 13C of the contact 13 arranged in the region R2, as shown in FIG. 9, the sheet type conductive member 15 is sandwiched between a lateral surface of the projection 16B and an inner surface of the projection accommodating portion 13C of the contact 13, and the shield layer 18D contacts the inner surface on the +X direction side of the projection accommodating portion 13C of the contact 13 with predetermined contact pressure, and the shield layer 18F contacts the inner surface on the −X direction side of the projection accommodating portion 13C of the contact 13 with predetermined contact pressure. Thus, both the shield layer 18D and the shield layer 18F that form the contact connecting portion C are electrically connected to the contact 13 arranged in the region R2.

Thus, with the connector 11 of Embodiment 1, without using a dedicated linking conductive member, both the shield layer 18D (first flexible conductor) and the shield layer 18F (second flexible conductor) respectively disposed on the front surface side and the rear surface side of the sheet type conductive member 15 can be electrically connected to the single contact 13 arranged in the region R2.

In addition, since the signal wiring layer 18B is exposed in, of the four contact arrangement regions 15A laid out on the front surface of the sheet type conductive member 15, the three regions R1 in which the three contacts 13 used as signal terminals are separately arranged, when the projection 16B of the bottom insulator 16 is inserted into the projection accommodating portion 13C of the contact 13 arranged in the region R1, although not shown, the sheet type conductive member 15 is sandwiched between the lateral surface of the projection 16B and the inner surface of the projection accommodating portion 13C of the contact 13, and the signal wiring layer 18B (third flexible conductor) contacts the inner surface of the projection accommodating portion 13C of the contact 13 with predetermined contact pressure and is electrically connected to the contact 13 arranged in the region R1.

It should be noted that a predetermined patterning is applied to the signal wiring layer 18B, and the three contacts 13 arranged in the three regions R1 are separately connected to three wires each formed of the signal wiring layer 18B and insulated from one another.

As shown in FIG. 3, since the signal wiring layer 18B is disposed between the shield layer 18D and the shield layer 18F while being insulated from the shield layer 18D and the shield layer 18F respectively disposed on the front surface side and the rear surface side of the sheet type conductive member 15, a shield effect with respect to the signal wiring layer 18B is exhibited when the contact 13 arranged in the region R2 and connected to the shield layer 18D and the shield layer 18F is connected to a ground potential, and it is possible to carry out highly accurate signal transmission with reduced influence of external disturbances caused by, for example, electromagnetic waves.

Figure 10:
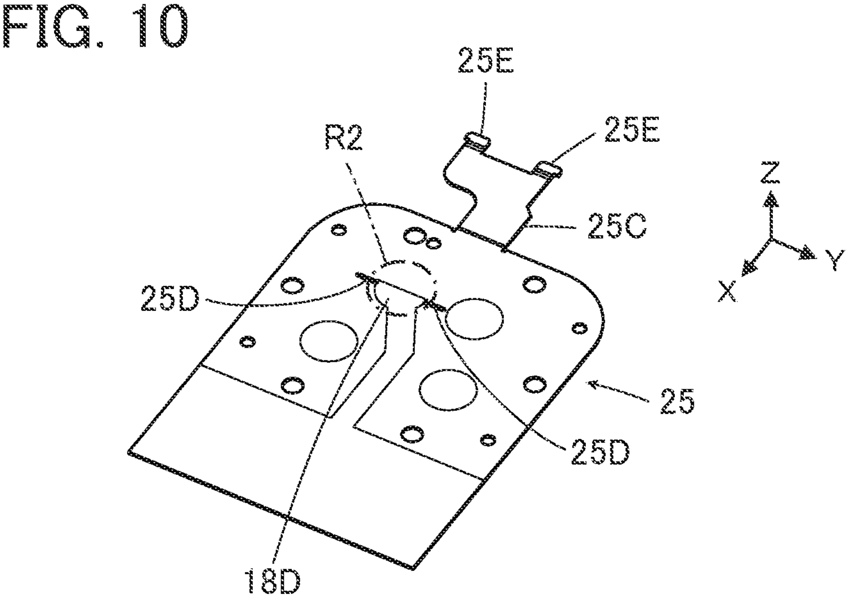
FIG. 10 is a perspective view of a sheet type conductive member in a modification of Embodiment 1, as viewed from an obliquely upper position.

In Embodiment 1 above, the insertion hole 15D of the sheet type conductive member 15 is formed in the region R2, and the insertion portion 15E of the tongue portion 15C is inserted into the insertion hole 15D, but the invention is not limited thereto; for example, like a sheet type conductive member 25 shown in FIG. 10, insertion holes 25D may be formed outside the region R2 and near the region R2.

In the sheet type conductive member 25, the insertion holes 25D are formed to respectively extend in the Y direction on the +Y direction side and the −Y direction side of the region R2 across the region R2, and a pair of insertion portions 25E are formed, with a distance therebetween in the Y direction, at a −X directional end portion of a tongue portion 25C of the sheet type conductive member 25. Each of the insertion portions 25E is formed to be wider in the Y direction than the corresponding insertion hole 25D.

The sheet type conductive member 25 has the same multilayer structure as that of sheet type conductive member 15 shown in FIG. 3, and the shield layer 18D is exposed toward the +Z direction at the +X direction-side portion of the region R2.

Figure 11:
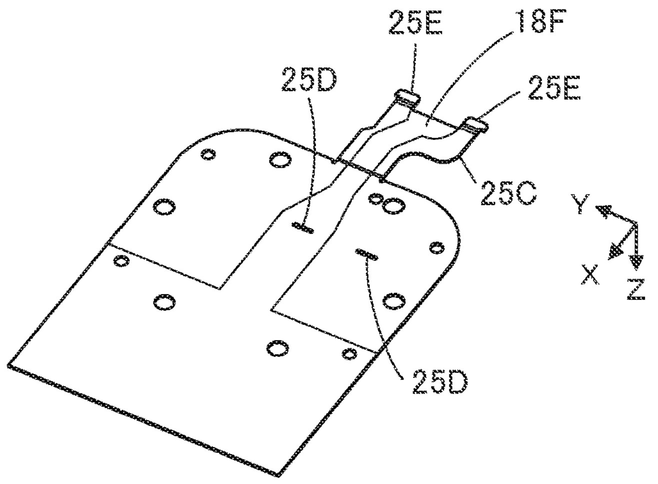
FIG. 11 is a perspective view of the sheet type conductive member in the modification of Embodiment 1, as viewed from an obliquely lower position.

In addition, as shown in FIG. 11, the shield layer 18F is exposed toward the −Z direction on the rear surface, facing in the −Z direction, of the tongue portion 25C.

Figure 12:
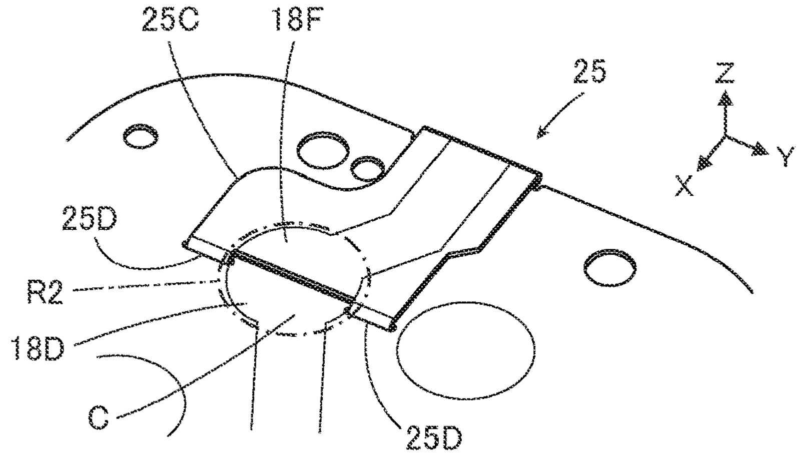
FIG. 12 is an enlarged partial perspective view of the sheet type conductive member in the modification of Embodiment 1 in a state where a tongue portion is folded back, as viewed from an obliquely upper position.
Figure 13:
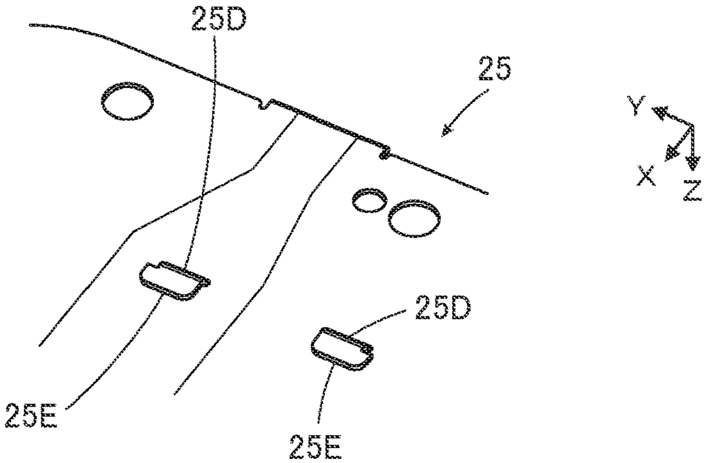
FIG. 13 is an enlarged partial perspective view of the sheet type conductive member in the modification of Embodiment 1 in the state where the tongue portion is folded back, as viewed from an obliquely lower position.

When the tongue portion 25C is folded back to the front surface side of the sheet type conductive member 25, as shown in FIG. 12, the shield layer 18F exposed on the rear surface of the tongue portion 25C is directed to the +Z direction, and in this state, as shown in FIG. 13, the pair of insertion portions 25E formed at the end portion of the tongue portion 25C are separately inserted into the pair of insertion holes 25D of the sheet type conductive member 25 from the +Z direction side to the −Z direction side.

Consequently, as shown in FIG. 12, the tongue portion 25C is retained while being folded back to the front surface side of the sheet type conductive member 25, the shield layer 18D is disposed on the +X direction-side portion of the region R2, and the shield layer 18F is disposed on the −X direction-side portion of the region R2, so that the contact connecting portion C formed of part of the shield layer 18D and part of the shield layer 18F is formed in the region R2.

Even when the sheet type conductive member 25 above is used, as with Embodiment 1 above, without using a dedicated linking conductive member, both the shield layer 18D (first flexible conductor) and the shield layer 18F (second flexible conductor) respectively disposed on the front surface side and the rear surface side of the sheet type conductive member 25 can be electrically connected to the single contact 13 arranged in the region R2.

Embodiment 2

Figure 14:
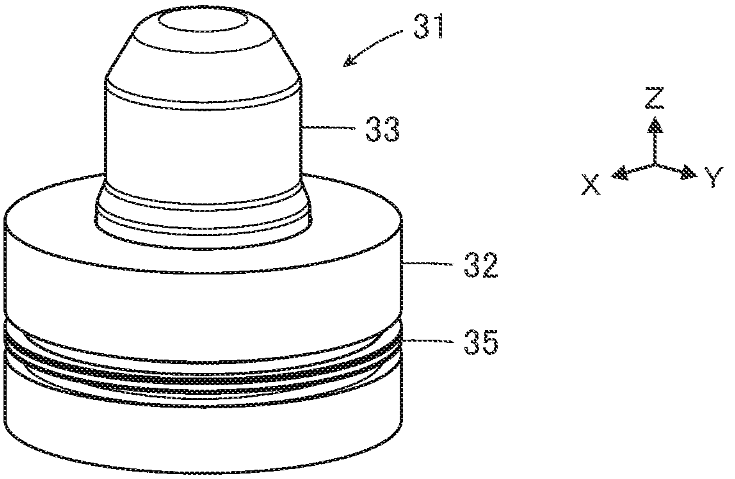
FIG. 14 is a partial perspective view showing a connector according to Embodiment 2.

FIG. 14 shows a connector 31 according to Embodiment 2. As with the connector 11 of Embodiment 1, the connector 31 is used as, for example, a garment-side connector for fitting a wearable device and has four contacts 33, but FIG. 14 shows only a contact 33 and a portion therearound used as a shield terminal, and the other contacts used as signal terminals are omitted.

The connector 31 includes a housing 32 made of an insulating material, a sheet type conductive member 35 and the contact 33 that are retained by the housing 32.

Figure 15:
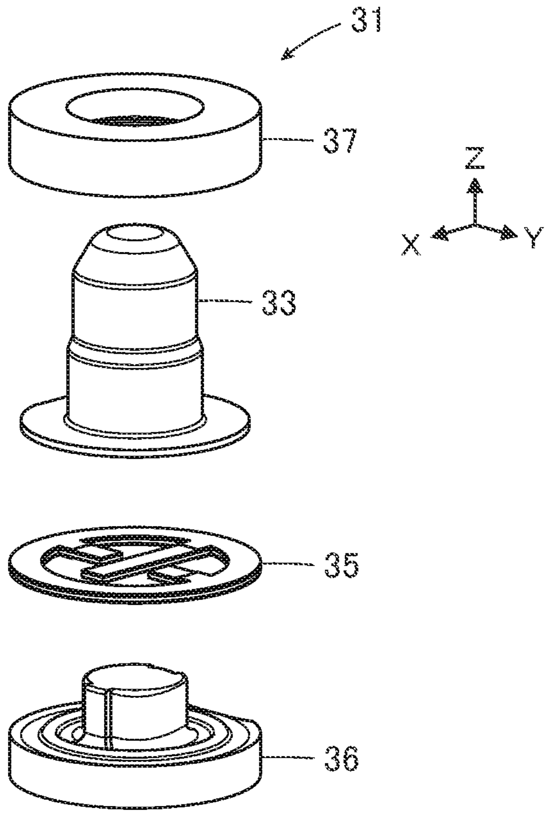
FIG. 15 is a partial exploded perspective view of the connector according to Embodiment 2.

As shown in FIG. 15, the connector 31 includes a bottom insulator 36 and a top insulator 37, and these bottom and top insulators 36 and 37 constitute the housing 32. The sheet type conductive member 35 and the contact 33 are disposed between the bottom insulator 36 and the top insulator 37.

Figure 16:
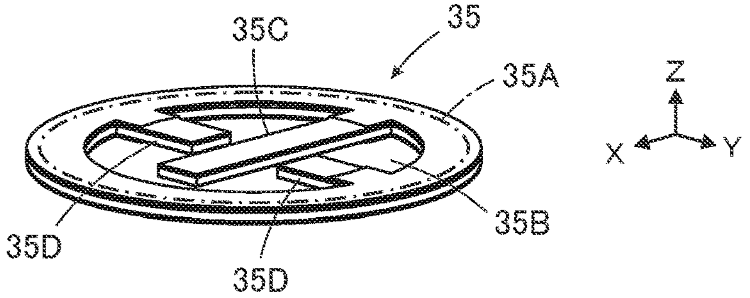
FIG. 16 is a partial perspective view showing a sheet type conductive member used in the connector of Embodiment 2.
Figure 17:
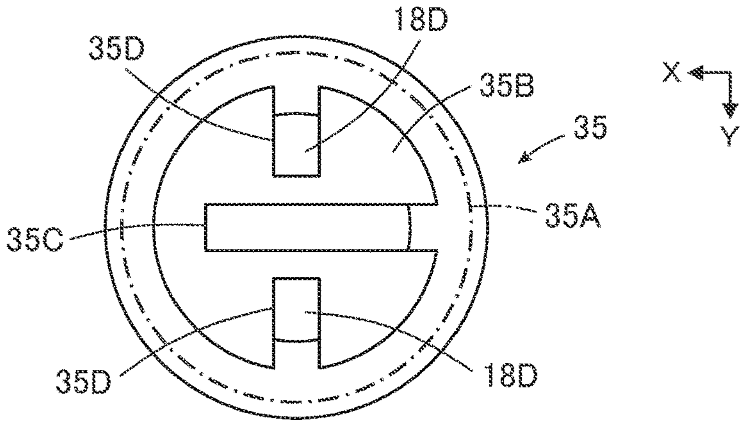
FIG. 17 is a partial plan view showing the sheet type conductive member used in the connector of Embodiment 2.

As with the sheet type conductive member 15 in Embodiment 1, four contact arrangement regions 35A are laid out on a front surface, facing in the +Z direction, of the sheet type conductive member 35, but as shown in FIGS. 16 and 17, an opening portion 35B of substantially circular shape penetrating the sheet type conductive member 35 in the Z direction is formed inside the contact arrangement region 35A in which the contact 33 used as a shield terminal is to be arranged.

The opening portion 35B is provided with its inner side with a tongue portion 35C extending in the opening portion 35B in the X direction from the periphery of the −X direction side of the contact arrangement region 35A in an XY plane, and a pair of protruding portions 35D respectively projecting in the opening portion 35B in the Y direction from the periphery of the +Y direction side and the periphery of the −Y direction side of the contact arrangement region 35A in the XY plane. The tongue portion 35C has an X directional length larger than a radius of the opening portion 35B of substantially circular shape, and the pair of protruding portions 35D each have a Y directional length smaller than the radius of the opening portion 35B of substantially circular shape.

Figure 18:
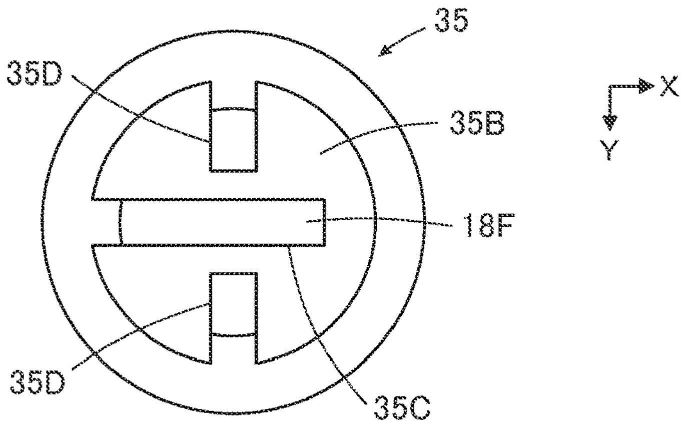
FIG. 18 is a partial bottom view showing the sheet type conductive member used in the connector of Embodiment 2.

As shown in FIG. 17, the shield layer 18D disposed on the front surface side of the sheet type conductive member 35 is exposed on a front surface, facing in the +Z direction, of each of the pair of the protruding portions 35D, and as shown in FIG. 18, the shield layer 18F disposed on the rear surface side of the sheet type conductive member 35 is exposed on a rear surface, facing in the −Z direction, of the tongue portion 35C.

Figure 19:
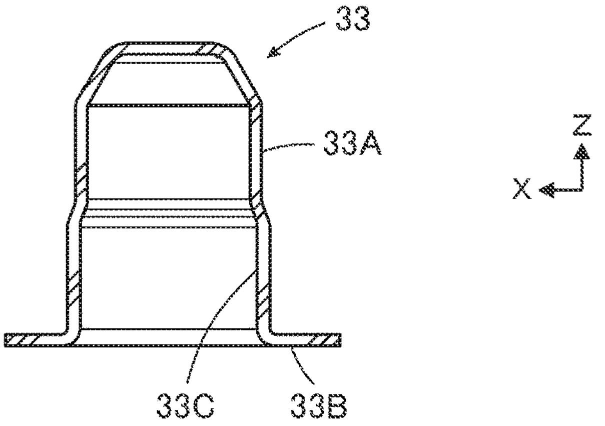
FIG. 19 is a cross-sectional view showing a contact used in the connector of Embodiment 2.

As shown in FIG. 19, as with the contact 13 in Embodiment 1, the contact 33 is a plug-type contact made of a conductive material such as metal and includes a tubular portion 33A of cylindrical shape extending in the Z direction, and a flange 33B extending along an XY plane from a −Z directional end portion of the tubular portion 33A, and the tubular portion 33A is provided in its interior with a projection accommodating portion 33C of recess shape opening in the −Z direction.

Figure 20:
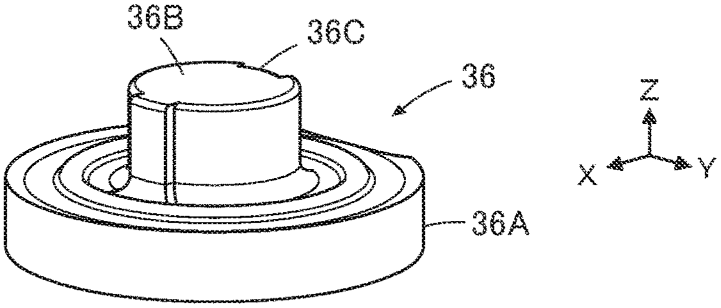
FIG. 20 is a partial perspective view showing a bottom insulator used in the connector of Embodiment 2.
Figure 21:
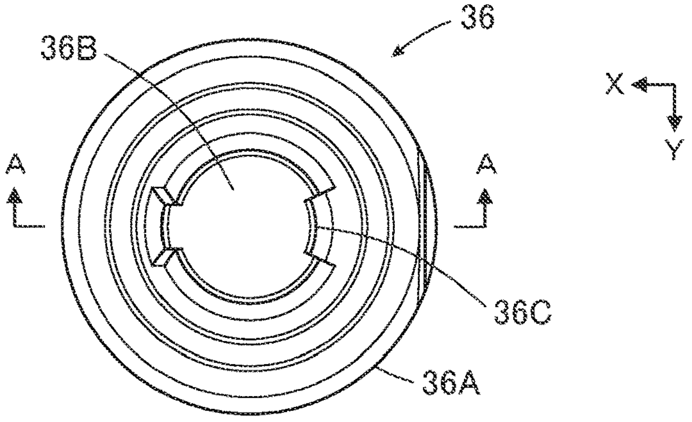
FIG. 21 is a partial plan view showing the bottom insulator used in the connector of Embodiment 2.
Figure 22:
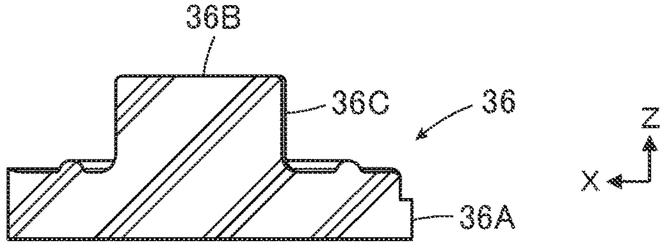
FIG. 22 is a cross-sectional view taken along line A-A in FIG. 21.

As shown in FIGS. 20 to 22, the bottom insulator 36 includes a flat plate portion 36A, and on the flat plate portion 36A, a projection 36B is formed to project in the +Z direction. When the connector 31 is assembled, the projection 36B is, together with the sheet type conductive member 35, inserted into the projection accommodating portion 33C of the contact 33, and a lateral surface on the −X direction side of the projection 36B is provided with a pressing portion 36C pressing the tongue portion 35C of the sheet type conductive member 35 against an inner surface of the projection accommodating portion 33C of the contact 33.

Since the tongue portion 35C being folded back at an intermediate portion in the X direction of the tongue portion 35C is sandwiched between the projection 36B and the inner surface of the projection accommodating portion 33C, the pressing portion 36C has a width slightly wider than a width dimension of the tongue portion 35C along a circumference of the projection 36B, and has a shape recessed, toward a central axis of the projection 36B, compared to the lateral surface on the +Y direction side and the lateral surface on the −Y direction side of the projection 36B.

Figure 23:
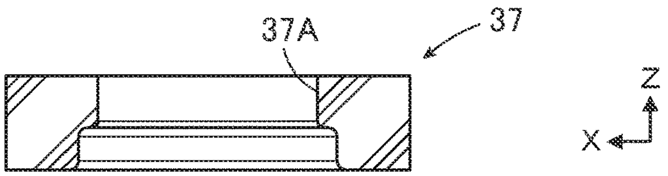
FIG. 23 is a partial cross-sectional view showing a top insulator used in the connector of Embodiment 2.

As shown in FIG. 23, the top insulator 37 has a contact through-hole 37A. The contact through-hole 37A has an inside diameter larger than an outside diameter of the tubular portion 33A of the contact 33 and smaller than an outside diameter of the flange 33B to allow smooth insertion of the tubular portion 33A of the contact 33.

Figure 24:
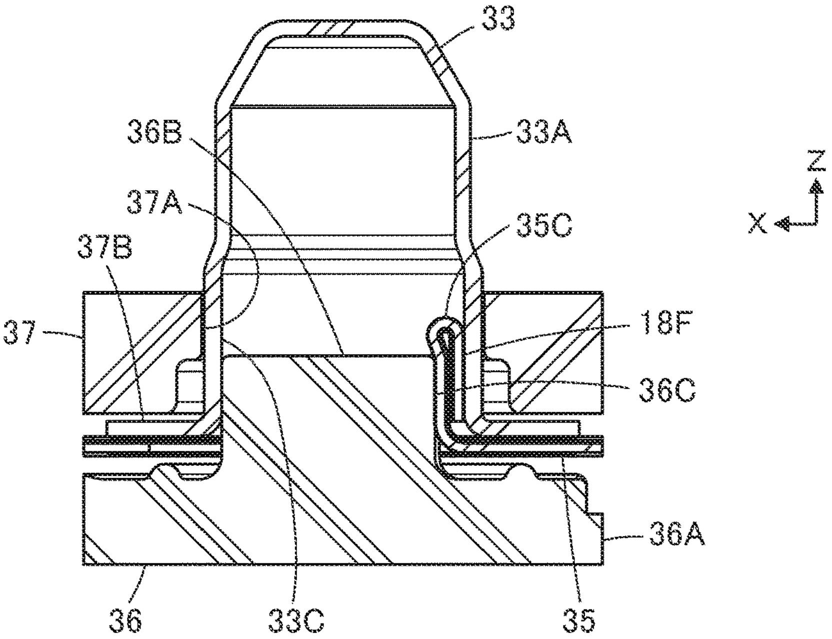
FIG. 24 is a partial cross-sectional view showing a state where a tongue portion and the contact are connected to each other in the connector of Embodiment 2.

When the connector 31 is assembled, as shown in FIG. 24, the tubular portion 33A of the contact 33 is inserted from the −Z direction into the contact through-hole 37A of the top insulator 37, and the bottom insulator 36 is pressed in the +Z direction against the top insulator 37 with the sheet type conductive member 35 being sandwiched therebetween. At this time, the tongue portion 35C of the sheet type conductive member 35 is folded back at the intermediate portion in the length direction of the tongue portion 35C so that the shield layer 18F exposed on a rear surface of the tongue portion 35C is directed to the +Z direction, and in this state, the tongue portion 35C is bent in the +Z direction by the projection 36B of the bottom insulator 36 and inserted into the projection accommodating portion 33C of the contact 33.

In this manner, the tongue portion 35C is sandwiched between the pressing portion 36C of the projection 36B and the inner surface of the projection accommodating portion 33C of the contact 33, but since the tongue portion 35C is folded back, the shield layer 18F contacts the inner surface on the −X direction side of the projection accommodating portion 33C of the contact 33 with predetermined contact pressure, the shield layer 18F is electrically connected to the contact 33.

Figure 25:
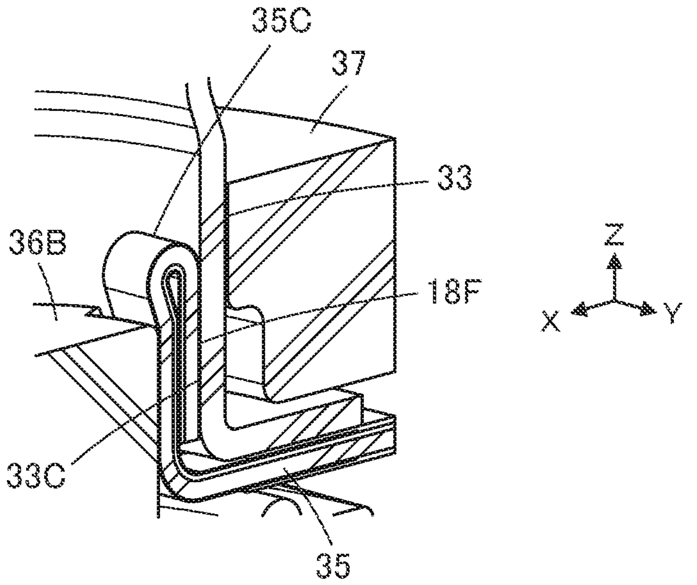
FIG. 25 is a partial cross-sectional perspective view showing the state where the tongue portion and the contact are connected to each other in the connector of Embodiment 2.

FIG. 25 shows a connecting state at this time between the shield layer 18F of the tongue portion 35C of the sheet type conductive member 35 and the inner surface of the projection accommodating portion 33C of the contact 33.

Figure 26:
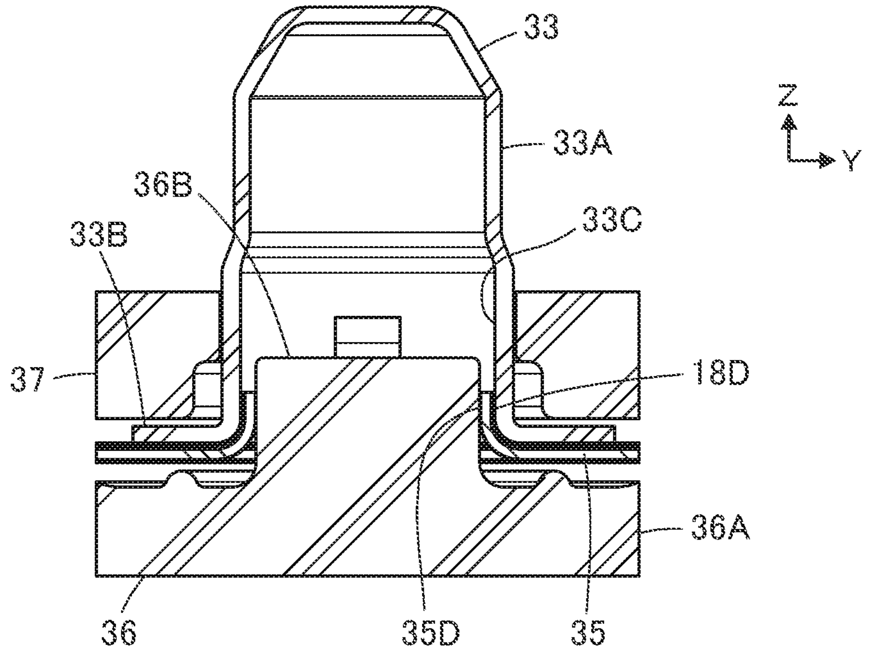
FIG. 26 is a partial cross-sectional view showing a state where a protruding portion and the contact are connected to each other in the connector of Embodiment 2.

In addition, as shown in FIG. 26, each of the pair of protruding portions 35D of the sheet type conductive member 35 is also bent in the +Z direction by the projection 36B of the bottom insulator 36, inserted into the projection accommodating portion 33C of the contact 33, and sandwiched between the lateral surface of the projection 36B and the inner surface of the projection accommodating portion 33C of the contact 33.

Since the shield layer 18D is exposed on the front surface, facing in the +Z direction, of these protruding portions 33D, the shield layer 18D of the pair of protruding portions 35D contacts the inner surface on the +Y direction side and on the −Y direction side of the projection accommodating portion 33C of the contact 33 with predetermined contact pressure, whereby the shield layer 18D is electrically connected to the contact 33.

Figure 27:
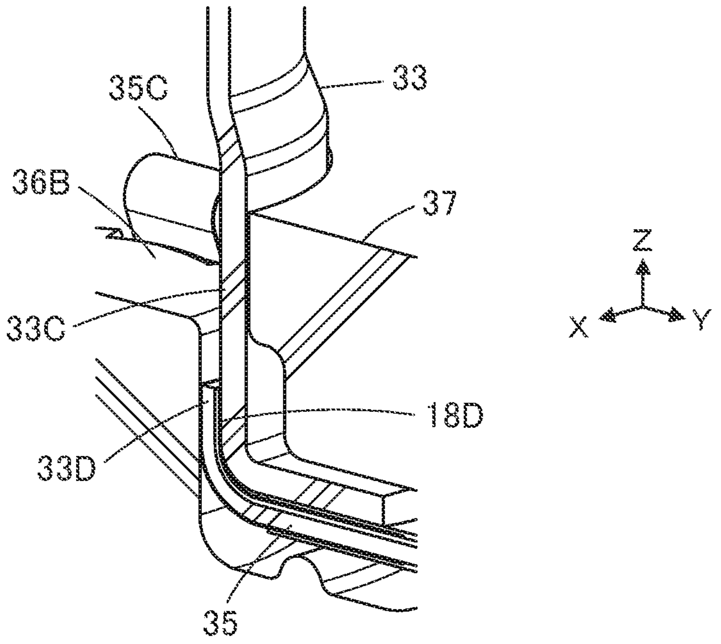
FIG. 27 is a partial cross-sectional perspective view showing the state where the protruding portion and the contact are connected to each other in the connector of Embodiment 2.

FIG. 27 shows a connecting state at this time between the shield layer 18D of the protruding portion 35D of the sheet type conductive member 35 and the inner surface of the projection accommodating portion 33C of the contact 33.

Consequently, the shield layer 18F of the tongue portion 35C and the shield layer 18D of the pair of protruding portions 35D are electrically connected to the contact 33.

In this manner, also with the connector 31 of Embodiment 2, without using a dedicated linking conductive member, both the shield layer 18D (first flexible conductor) and the shield layer 18F (second flexible conductor) respectively disposed on the front surface side and the rear surface side of the sheet type conductive member 35 can be electrically connected to the single contact 33 arranged in the contact arrangement region 35A.

In addition, although not shown, as with Embodiment 1, the other contacts 33 used as signal terminals are separately disposed in the contact arrangement regions of the sheet type conductive member 35 on which the signal wiring layer 18B is exposed, and are electrically connected to the signal wiring layer 18B. Since the signal wiring layer 18B is disposed between the shield layer 18D and the shield layer 18F respectively disposed on the front side surface and the rear side surface of the sheet type conductive member 35 while being insulated from the these shield layers 18D and 18F, by connecting, to a ground potential, the contact 33 connected to the shield layer 18D and the shield layer 18F, a shield effect with respect to the signal wiring layer 18B is exhibited, and it is possible to carry out highly accurate signal transmission with reduced influence of external disturbances caused by, for example, electromagnetic waves.

Figure 28:
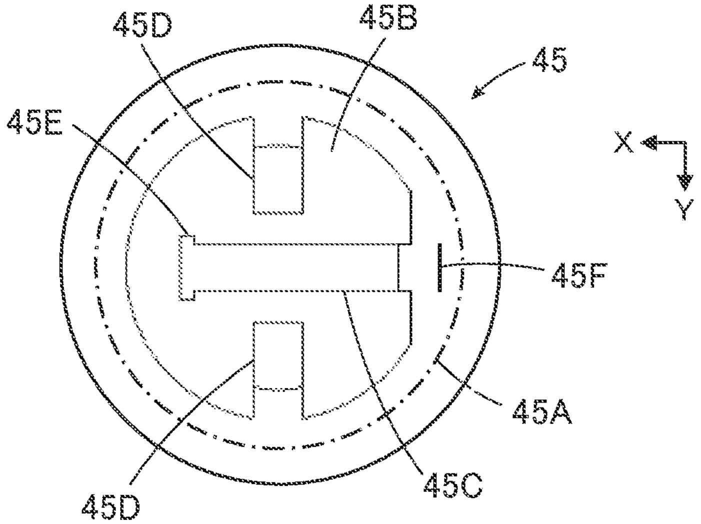
FIG. 28 is a partial plan view showing a sheet type conductive member in a modification of Embodiment 2.

Instead of the sheet type conductive member 35, a sheet type conductive member 45 shown in FIG. 28 may be used. As with the sheet type conductive member 35, an opening portion 45B is formed inside a contact arrangement region 45A laid out on a front surface, facing in the +Z direction, of the sheet type conductive member 45, and a tongue portion 45C extending in the +X direction and a pair of protruding portions 45D extending in the Y direction are disposed in the opening portion 45B. Although not shown, the shield layer 18F is exposed on a rear surface, facing in the −Z direction, of the tongue portion 45C, and the shield layer 18D is exposed on front surfaces, facing in the +Z direction, of the pair of protruding portions 45D.

In the sheet type conductive member 45, an insertion hole 45F penetrating from the front surface to a rear surface of the sheet type conductive member 45 is formed at a root portion of the tongue portion 45C and inside the contact arrangement region 45A, and an insertion portion is formed, at a +X directional end portion of the tongue portion 45C, to be wider in the Y direction than the insertion hole 45F.

Owing to the use of the sheet type conductive member having such a structure, the tongue portion 45C being folded back to the front surface side of the sheet type conductive member 45 is retained because the insertion portion 45E formed at the end portion of the tongue portion is inserted into the insertion hole 45F of the sheet type conductive member 45 when the tongue portion 45C is folded back at an intermediate portion in the X direction of the tongue portion 45C as with Embodiment 1.

Therefore, the operability in assembling the connector can be improved.

Figure 29:
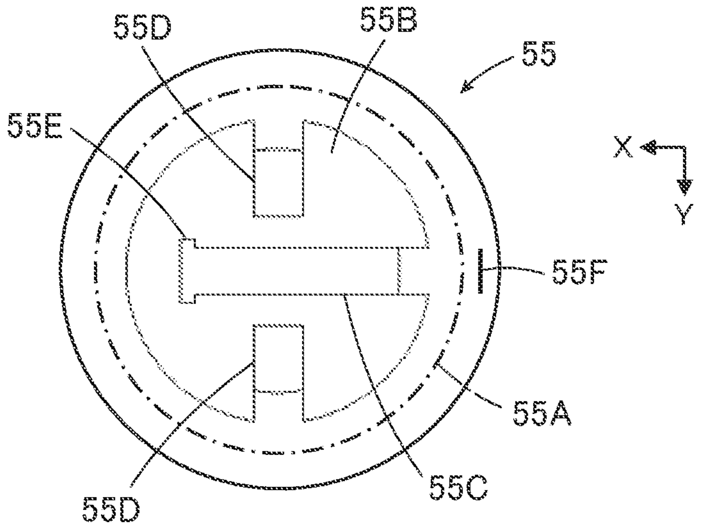
FIG. 29 is a partial plan view showing a sheet type conductive member in another modification of Embodiment 2.
Figure 30:
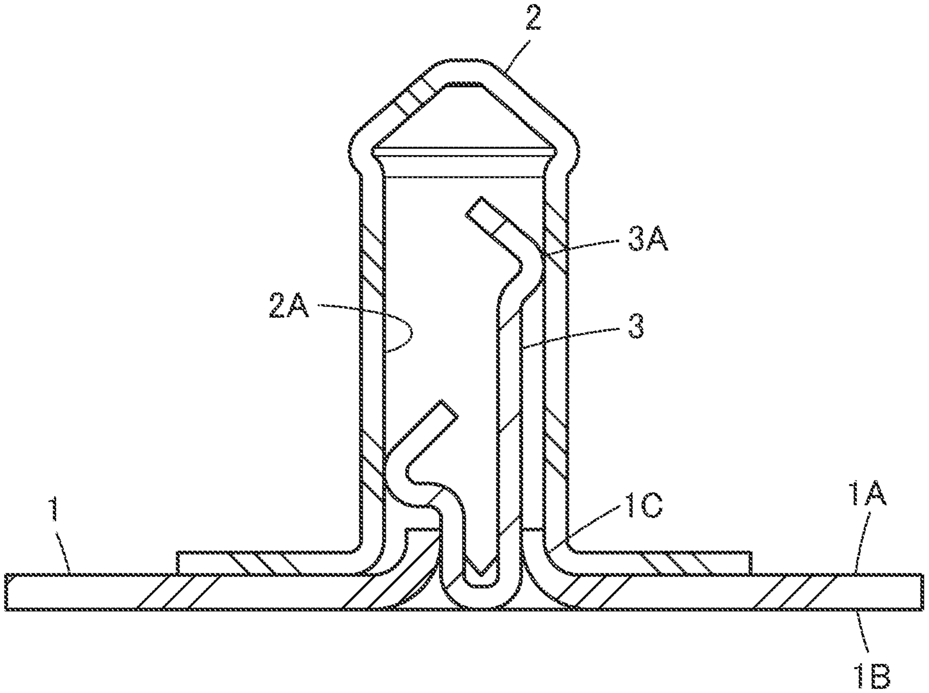
FIG. 30 PRIOR ART
FIG. 30 is a cross-sectional view showing a conventional connecting structure.

Further, a sheet type conductive member 55 shown in FIG. 29 may be used. As with the sheet type conductive member 45, an opening portion 55B is formed inside a contact arrangement region 55A laid out on a front surface, facing in the +Z direction, of the sheet type conductive member 55, and a tongue portion 55C extending in the +X direction and a pair of protruding portions 55D extending in the Y direction are disposed in the opening portion 55B. Although not shown, the shield layer 18F is exposed on a rear surface, facing in the −Z direction, of the tongue portion 55C, and the shield layer 18D is exposed on front surfaces, facing in the +Z direction, of the pair of protruding portions 55D.

In the sheet type conductive member 55, an insertion hole 55F penetrating from the front surface to a rear surface of the sheet type conductive member 55 is formed at the −X direction side of the tongue portion 55C and outside the contact arrangement region 55A, and an insertion portion 55E is formed, at a +X directional end portion of the tongue portion 55C, to be wider in the Y direction than the insertion hole 55F.

Owing to the use of the sheet type conductive member 55 having such a structure, the tongue portion 55C being folded back to the front surface side of the sheet type conductive member 55 is retained because the insertion portion 55E formed at an end portion of the tongue portion is inserted into the insertion hole 55F of the sheet type conductive member 55 when the tongue portion 55C is folded back at an intermediate portion in the X direction of the tongue portion 55C.

Therefore, even when the sheet type conductive member is used, the operability in assembling the connector can be improved.

While the sheet type conductive members 15, 25, 35 used in Embodiments 1 and 2 above have the multilayer structure shown in FIG. 3, the invention is not limited thereto, and it suffices if a sheet type conductive member has at least a first flexible conductor and a second flexible conductor respectively disposed on the front surface side and the rear surface side of the sheet body.

In addition, while the two conductive layers, i.e., the shield layer 18D and the shield layer 18F of the sheet type conductive member 15, 25, 35 are connected to the single contact 13, 33 used as a shield terminal in Embodiments 1 and 2 above, the invention is not limited thereto. For example, a plurality of tongue portions are formed in a sheet type conductive member having three or more conductive layers, and these tongue portions are folded back; owing to this configuration, a contact connecting portion composed of parts of the respective conductive layers can be formed in a contact arrangement region, and thus, the three or more conductive layers can be connected to a single contact in the same manner.

In addition, while the connector 11 according to Embodiment 1 above and the connector 31 according to Embodiment 2 above have the four contacts 13, 33 including the contact used as a shield terminal and the contacts used as signal terminals, the invention is not limited to this number of contacts, and it suffices if the connector includes at least a single contact electrically connected to the first flexible conductor and the second flexible conductor respectively disposed on the front surface side and the rear surface side of the sheet body of the sheet type conductive member 15, 25, 35.

While the plug-type contacts 13, 33 are used in the above-described Embodiments 1 and 2, the invention is not limited thereto, and it is also possible to similarly configure a connector having receptacle-type contacts.

While, in the connector 11 of Embodiment 1, the reinforcement sheet 14 is disposed between the bottom insulator 16 and the top insulator 17, the reinforcement sheet 14 may be omitted when it is not necessary to reinforce a mounting object such as a garment to which the connector 11 is to be attached. In addition, the reinforcement sheet 14 used in Embodiment 1 may be disposed between the bottom insulator 36 and the top insulator 37 of the connector 31 of Embodiment 2.

What is claimed is:

1. A sheet type conductive member that extends along a predetermined plane and is attached to a connector, the sheet type conductive member comprising:

a sheet body having insulating properties; and a first flexible conductor disposed on a front surface side of the sheet body, and a second flexible conductor disposed on a rear surface side of the sheet body, wherein the sheet type conductive member comprises a tongue portion projecting in a tongue shape in the predetermined plane, wherein a contact arrangement region in which a contact of the connector is arranged is laid out on a front surface of the sheet type conductive member, wherein the first flexible conductor is exposed on the contact arrangement region, wherein the second flexible conductor is exposed on a rear surface of the tongue portion, and wherein at least part of the tongue portion is folded back to a front surface side of the sheet type conductive member so that a contact connecting portion composed of part of the first flexible conductor and part of the second flexible conductor is formed in the contact arrangement region.

2. The sheet type conductive member according to claim 1, wherein on an outside of the contact arrangement region, the tongue portion extends in a direction away from the contact arrangement region.

3. The sheet type conductive member according to claim 1, further comprising a third flexible conductor disposed between the first flexible conductor and the second flexible conductor and electrically insulated from the first flexible conductor and the second flexible conductor.

4. The sheet type conductive member according to claim 1, further comprising an opening portion formed in the contact arrangement region, wherein the tongue portion extends from a periphery of the contact arrangement region toward an inside of the opening portion.

5. The sheet type conductive member according to claim 4, wherein the sheet type conductive member comprises, in the contact arrangement region, at least one protruding portion projecting in the predetermined plane from the periphery of the contact arrangement region toward the inside of the opening portion, and wherein the first flexible conductor is exposed on a front surface of the at least one protruding portion.

6. The sheet type conductive member according to claim 1, further comprising an insertion hole penetrating from the front surface to a rear surface of the sheet type conductive member, wherein the tongue portion is provided at its tip with an insertion portion formed to be wider than the insertion hole, and wherein the insertion portion of the tongue portion folded back to the front surface side of the sheet type conductive member is inserted into the insertion hole, whereby the tongue portion folded back is retained.

7. The sheet type conductive member according to claim 6, wherein the insertion hole is formed in the contact arrangement region.

8. The sheet type conductive member according to claim 6, wherein the insertion hole is formed outside the contact arrangement region.

9. A connector configured to be fitted with a counter connector in a fitting direction, comprising:

a sheet type conductive member that extends along a predetermined plane;

a contact; and a housing having insulating properties and configured to retain the sheet type conductive member and the contact, wherein the sheet type conductive member comprises:

a sheet body having insulating properties; and a first flexible conductor disposed on a front surface side of the sheet body, and a second flexible conductor disposed on a rear surface side of the sheet body, wherein the sheet type conductive member comprises a tongue portion projecting in a tongue shape in the predetermined plane, wherein a contact arrangement region in which a contact of the connector is arranged is laid out on a front surface of the sheet type conductive member, wherein the first flexible conductor is exposed on the contact arrangement region, wherein the second flexible conductor is exposed on a rear surface of the tongue portion, wherein at least part of the tongue portion is folded back to a front surface side of the sheet type conductive member so that a contact connecting portion composed of part of the first flexible conductor and part of the second flexible conductor is formed in the contact arrangement region, wherein the contact is connected to the contact connecting portion in the contact arrangement region.

10. The connector according to claim 9, wherein the contact comprises a projection accommodating portion of recess shape, wherein the housing has a projection inserted into the projection accommodating portion of the contact, and wherein when the projection is, together with the sheet type conductive member, inserted into the projection accommodating portion of the contact, the first flexible conductor and the second flexible conductor that are disposed in the contact arrangement region are sandwiched between a lateral surface of the projection and an inner surface of the projection accommodating portion in a direction orthogonal to the fitting direction so as to contact the inner surface of the projection accommodating portion, whereby the contact is electrically connected to the first flexible conductor and the second flexible conductor.

11. The connector according to claim 10, wherein the contact has a tubular portion in which the projection accommodating portion is formed, and a flange that is formed at one end of the tubular portion, wherein the housing comprises a top insulator provided with a contact through-hole that is penetrated by the tubular portion of the contact and is smaller than the flange, and a bottom insulator provided with the projection, and wherein the top insulator is fixed to the bottom insulator such that the tubular portion of the contact penetrates the contact through-hole and the sheet type conductive member and the flange are sandwiched between the top insulator and the bottom insulator, whereby the sheet type conductive member and the contact are retained in the housing.

* * * * *